2 Sheets--Sheet 1.

S. COOK.

Automatic Boiler-Feeders.

No. 5,276. Reissued Feb. 11, 1873.

Attest.
C. G. Hall
Jeremiah Dwohig.

Silas Cook, Assr. to Automatic Boiler Feeder Co.
per Fisher & Fisher
Attys.

Inventor.

A.M. PHOTO-LITHOGRAPHIC CO. N.Y. (OSBORNE'S PROCESS.)

2 Sheets--Sheet 2.

S. COOK.
Automatic Boiler-Feeders.

No. 5,276. Reissued Feb. 11, 1873.

Silas Cook, Ass'r to Inventor.
Automatic Boiler Feeder Co
per Fisher & Fisher
Attys.

Attest.
C. G. Hogle
Jeremiah Dwohig.

AM. PHOTO-LITHOGRAPHIC CO. N.Y. (OSBORNE'S PROCESS)

UNITED STATES PATENT OFFICE.

SILAS COOK, OF MAGNOLIA, IOWA, ASSIGNOR, BY MESNE ASSIGNMENTS, TO THE AUTOMATIC BOILER-FEEDER COMPANY.

IMPROVEMENT IN AUTOMATIC BOILER-FEEDERS.

Specification forming part of Letters Patent No. 97,361, dated November 30, 1869; reissue No. 5,276, dated February 11, 1873.

*To all whom it may concern:*

Be it known that SILAS COOK, residing at Magnolia, in the county of Harrison and State of Iowa, was the inventor of a certain new and useful Improvement in Automatic Boiler-Feeders, of which the following is a specification:

This invention relates to improvements in the method of supplying steam-boilers with water, whereby a uniform height of water in the boiler is automatically maintained. The first part of my invention consists in an automatic mechanism or apparatus for receiving, heating, and discharging water into the boiler at a temperature near the boiling-point, and in quantities requisite to preserve the water-line in the boiler at a uniform height, the arrangement and operation of which apparatus or mechanism are hereinafter more fully described. The second part of my invention relates to devices by means of which the feeding apparatus will automatically supply itself with water from a well or cistern placed at a lower level than the feeder itself, the amount of water raised being regulated by the supply in the boiler.

Figure 1:
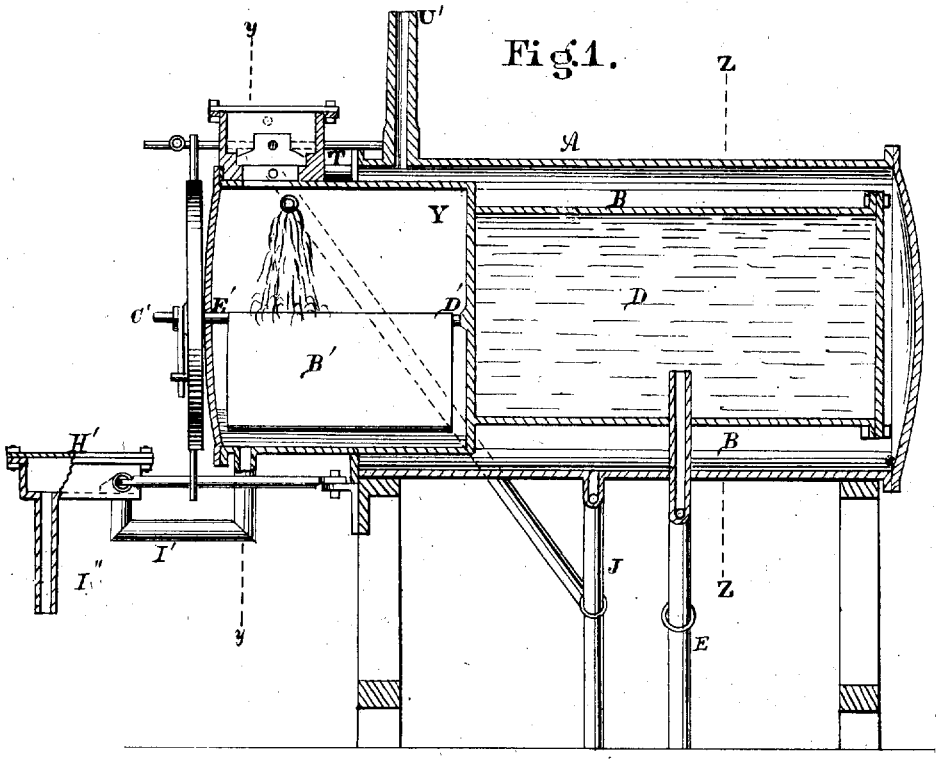
Figure 2:
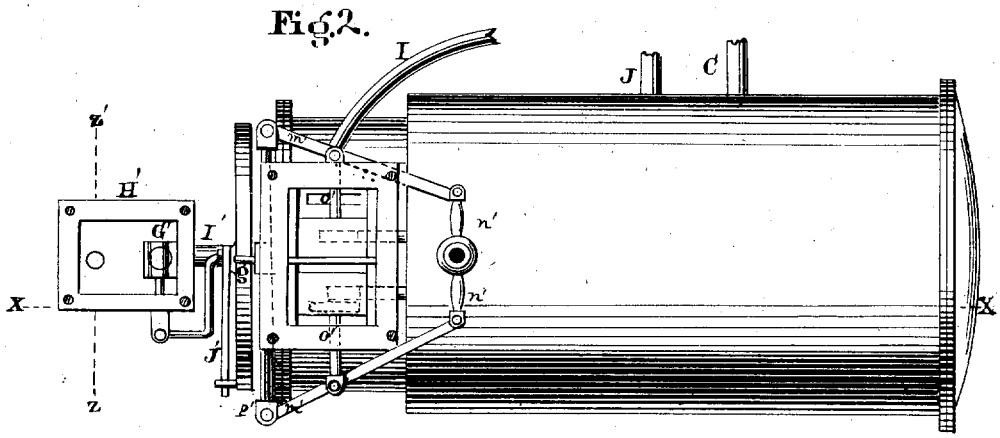
Figure 4:
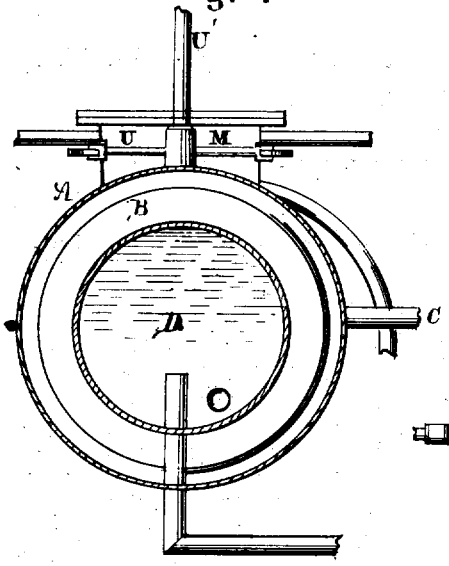
Figure 3:
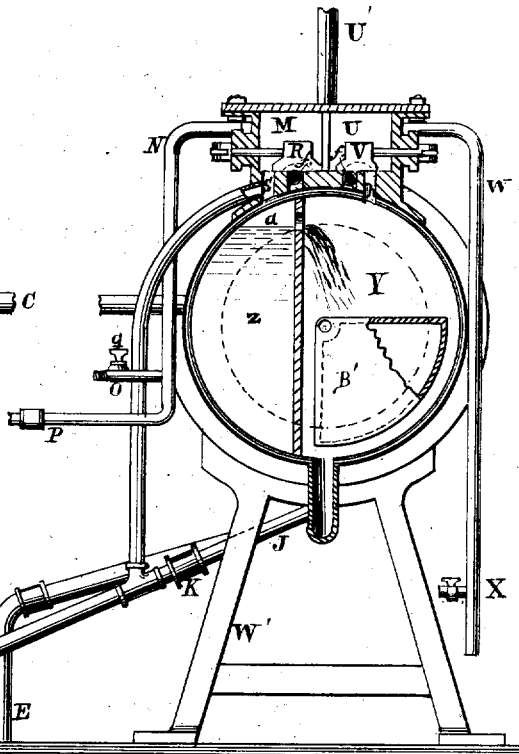
Figure 3:
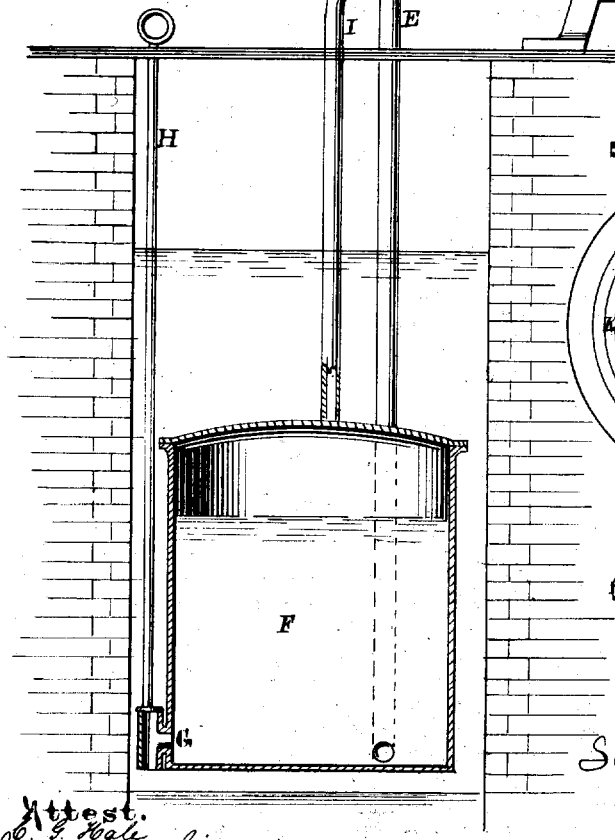
Figure 5:
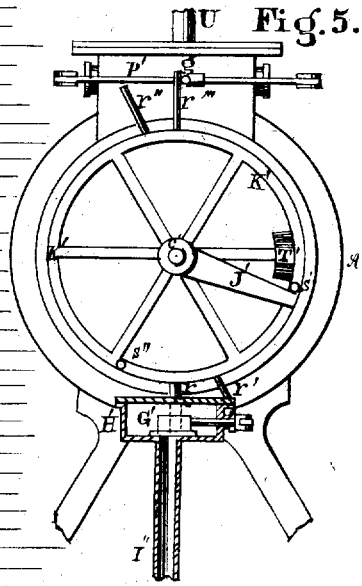

In the accompanying drawing, Figure 1, Plate I, represents a vertical section of the heater through the line X X of Fig. 2, showing the general arrangement of parts and the float and the pipes connected with the heater. Fig. 2, same plate, is a top or plan view of the heater, partly in section, showing the valves and valve movements. Fig. 3, Plate II, is a vertical cross-section of Fig. 1 through the line *y*, and also a view of the supply-tank and cistern. Fig. 4 is a vertical cross-section of Fig. 1 through the line Z Z. Fig. 5 is a front-end view, showing also a vertical section of the valve and pipe through which feed-water is admitted to the boiler.

Similar letters of reference indicate corresponding parts.

A is the heater, which is formed of two cylindrical or other formed vessels, with an annular space, B, between, into which the exhaust steam from the engine is discharged through the pipe C. D is the water-chamber, which, as seen in the drawing, is surrounded by the exhaust steam. Water is forced into this chamber through the pipe E, which is connected with the lower portion of the supply-cistern, as is indicated in dotted lines in Fig. 3. This pipe E is provided near its upper extremity with an induction-valve, which, pressure thereon being removed, prevents the egress of the water in the usual manner. F represents the supply-tank, which is submerged in the well, cistern, or reservoir, and which fills through the hollow plug seen at G. This plug has a ball-valve, which rises from its seat when the water flows in to fill the tank, and closes down and prevents the escape of water in the tank. A flap-valve inside of the tank, and valves otherwise arranged, may be used for this purpose. I attach a rod, H, to this valve, so that it may be readily raised for repairs, when necessary, without disturbing the tank. The water is forced from the tank F by introducing steam through the pipe I, either directly from the boiler or from the exhaust-port of the engine. J is a pipe, which conducts the water of condensation from the annular space B down into the tank. There is a check-valve at K, and as the steam acts periodically through the pipe I, according to the wants of the boiler, as will be hereinafter described, the check-valve closes by the pressure of the steam, and opens for the escape of the water of condensation when the pressure is removed. The steam which is thus used first enters the valve-chamber M through the pipe N. This pipe connects directly with the boiler by means of the pipe O, and with the exhaust-port by means of the pipe P.

Should the pressure from the exhaust-port not be sufficient to raise the water the cock *q* in the steam-pipe O may be opened, when steam at boiler-pressure will be discharged into the tank F. In practice I have a float arranged in the tank, upon which the steam acts instead of acting in direct contact with the water. This prevents condensation to a great degree. The inside of the tank itself is lined with wood or some good non-conductor for the same purpose; but the water of condensation, which is discharged into the tank at a temperature but little below the boiling-point, prevents any injurious condensation in the tank.

Experience has proved that with this arrangement steam can be used for raising water to better advantage than in any other manner. As before stated, the steam which is used for this purpose is first introduced into the valve-chamber M. This chamber is, in fact, always in communication with the exhaust-port, or with the boiler, or with both. It is provided with a slide-valve, R, and two ports, S *f*.

As seen in the drawing, Fig. 3, Plate II, steam is being admitted to the steam-pipe I. When the valve slides back it shuts off the steam from the pipe I, but opens a communication between this pipe I and the annular space B of the heater by means of a short pipe, T, into which port *f* opens, as seen in Fig. 1, by which means an equilibrium of pressure is produced in the tank and in the annular space B. Whether live or exhaust steam is being used to force water from the cistern, the water will continue to flow into the feeder until the valve shifts, which closes the port S and thus interrupts the communication between the boiler or the engine and the cistern. At the same time communication is established between the cistern and the annular space B through the ports S *f* and pipe T; and by reason of the equilibrium thus produced the flow of water ceases, and will only commence again when port S is uncovered and steam again acts upon the water in the cistern.

U, Fig. 3, represents another valve-chamber, provided with ports and slide-valve V. This chamber U is in communication with the boiler by means of the pipe W, the lower end of which extends down a little below the usual water-line. The desired water-line, below which the water in the boiler should not be permitted to fall, may be considered to be at X, Fig. 3. As long as the water is above the point X the pressure of the steam will force water through the pipe W into the chamber U. When the water falls below that line steam will enter through the opening at X and be discharged into the chamber.

As represented in Fig. 1, the heater *a* is connected with a float-chamber, Y, which chamber is separated by a vertical partition from another water-chamber, Z. This chamber Z communicates with the water-chamber D, and both are supposed to be, at all times, full of water up to the line *a*, Fig. 3. When the water rises above that line it is discharged into the float-chamber Y through an orifice in the partition, as seen in the drawing. B′ represents a float, which in this case is made in the form of a quarter of a cylinder. C′ is a shaft, to which the central angle of the float is attached. This shaft, with the float, turns freely on bearings at D′ and E′ and is arranged so that it makes only one-fourth of a revolution. When the chamber Y is filled so as to raise the float and turn the shaft the fourth of a revolution the valve V is moved and the port *h* uncovered, which establishes a connection between the boiler and the float-chamber through the pipe W, and at the same time a valve, G′, in the valve-chamber H′ is moved in the manner hereinafter described, uncovering a port which gives a second channel of communication between the boiler and the float-chamber through the pipes I′ and I″, thereby establishing an equilibrium of pressure in the float-chamber. If, at the time the valves are thus shifted and their respective ports are opened, the water in the boiler has fallen to such a level that steam enters pipe W, the water in the float-chamber will be discharged by the force of gravity, and the float will thereupon return to its former position. The rising and falling of the float operates all the slide-valves by means of an arm, J′, on the outer end of the float-shaft C′. K′ is a weighted wheel, which revolves freely on the shaft C′ with pins in its periphery, which, as the float rises and falls, strike other pins on the valve-gear, and thus operate the valves. The valve-gear is seen in the plan view, Fig. 2. *m′ m′* are two levers, which have their fulcrums on the fixed bar *n′*, and to these levers the valve-rods *o′ o′* of the valves R and V are attached. The levers *m′* are connected together by a rod, P′, which has a projecting tappet-pin, *g*. *r r′* and *r″ r‴* represent two pairs of pins on the periphery of the wheel K′. *s′ s″* represent two pins, which project from the side of the rim of the wheel K′. When the arm J′ on the end of the float-shaft is raised by the partial revolution of that shaft it strikes the pin *s′* and revolves the wheel, carrying it up until the weight T′ is carried over the center of the wheel, so that by its gravity it will revolve the wheel till the pin *r′* strikes the pin *g*, and thus changes the valve. This takes place as the float is raised to its highest point, so that the changing of the valves produces the effect before described, allowing the water in the float-chamber to drop into the boiler through the pipe I″ as soon as the water in the boiler falls to such a level that steam enters the pipe W, the valve G′ being shifted at the same time with the valves R and V by means of the pin *r″* striking against a lever which is connected with this valve. The float falls as the water leaves the float-chamber, when the arm J′ will act against the pin *s″*, which will carry the weight T′ back over the center of the wheel until it again drops by its own gravity and moves the valves into the position seen in the drawing. This operation will be repeated only as often as the boiler requires an additional supply of water, for it will be understood that water can be introduced into the boiler only when steam enters the valve-chamber U, and this will take place only when the water in the boiler falls below the desired water-line. The port *f* connects the chamber U with the annular space B, and permits the steam which would otherwise be trapped in the float-chamber Y by the shifting of the valve V as the float falls to pass out into the annular space B, where it is made to aid in heating the water-chamber D.

I do not confine myself to the particular valve arrangement here shown. A single slide-valve, instead of the two valves R and V, may be made to answer the purposes of both; and I propose to use either one or two valves and to otherwise vary the minor details of the arrangement, as further experience may suggest.

U′ is a blow-off pipe for the annular steam-space B. The heater is elevated on stands W′ on piers of masonry, or in any other manner, to any desired height on top of or above the boiler. By adequate pressure of steam in the tank F, water may be elevated to the heater from any required depth, and in the most economical manner.

It will be noticed that with this feeder, connected with a steam-boiler, it is immaterial whether the engine is running or not. This apparatus will work whenever the water falls below the desired water-line, whether it falls by reason of vaporization, leakage, or any other cause.

The advantages of this arrangement for feeding boilers are many and obvious, among which may be named perfect safety, absence of friction, and surety of action when once set in action.

What I claim as new, and desire to secure by Letters Patent, is—

1. The valve R, operating substantially as described to control the communication between the steam-pipe and the cistern, and also the communication between the steam-chamber of the feeder and the cistern.

2. The combination, in a boiler-feeder, of a valve, R, and a float, B′, or its equivalent, operating substantially as described, to control the entrance of steam into the cistern or tank, and thus automatically regulate the supply of water to the feeder.

3. The combination, in a boiler-feeder, of the steam-chamber B, the water-chamber D, and the float-chamber Y, substantially as described.

4. The combination of water-chamber D, chamber Z having aperture *a*, and chamber Y, to raise the valve-float B′ at the time specified, and for the purpose set forth.

5. The combination, in a boiler-feeder, of a water-chamber and inclosing steam-space, and a waste-pipe for the water of condensation, said waste-pipe connecting with the water-tank or cistern, substantially as shown.

6. The combination of the steam-space B and the float-chamber Y by means of the valve V and the ports *f* and *h*, substantially as and for the purpose set forth.

7. The float B′, operated in the manner described, in combination with the short arm J′ and the weighted wheel K′ having pins *r r′ r″ r‴ s′ s″* thereon to operate the valve-gear, in the manner specified.

THE AUTOMATIC BOILER-FEEDER CO.,
Per CHARLES S. BURT, *Prest.*,
JNO. H. LULL, *Secy.*
SILAS COOK.

Witnesses:
L. J. TAYLOR,
FRANK M. ROBINSON.